US010488008B2

(12) United States Patent
Dassanayake et al.

(10) Patent No.: US 10,488,008 B2
(45) Date of Patent: Nov. 26, 2019

(54) VEHICLE LIGHT ASSEMBLY WITH PHOTON RECYCLING

(71) Applicant: Ford Global Technologies, LLC, Dearborn, MI (US)

(72) Inventors: Mahendra Somasara Dassanayake, Bloomfield Hills, MI (US); Anthony Nicholas Aquilina, Royal Oak, MI (US); Arun Kumar, Farmington Hills, MI (US); Stephen Kenneth Helwig, Farmington Hills, MI (US); Sleiman N Abdelnour, Macomb, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 464 days.

(21) Appl. No.: 14/883,094

(22) Filed: Oct. 14, 2015

(65) Prior Publication Data

US 2016/0040849 A1 Feb. 11, 2016

Related U.S. Application Data

(63) Continuation of application No. 13/443,298, filed on Apr. 10, 2012, now abandoned.

(51) Int. Cl.
| | |
|---|---|
| *F21S 43/14* | (2018.01) |
| *F21S 43/19* | (2018.01) |
| *F21S 43/33* | (2018.01) |
| *F21S 43/40* | (2018.01) |
| *F21Y 115/10* | (2016.01) |
| *F21S 43/20* | (2018.01) |

(52) U.S. Cl.
CPC ............ *F21S 43/14* (2018.01); *F21S 43/19* (2018.01); *F21S 43/26* (2018.01); *F21S 43/33* (2018.01); *F21S 43/40* (2018.01); *F21Y 2115/10* (2016.08)

(58) Field of Classification Search
CPC ........ F21S 48/215; F21S 48/217; F21S 48/22; F21S 48/2212; F21S 48/2287; F21S 48/23; F21S 48/238; F21S 48/24
See application file for complete search history.

(56) References Cited

U.S. PATENT DOCUMENTS

| | | | |
|---|---|---|---|
| 4,225,906 | A | 9/1980 | Gulliksen et al. |
| 4,630,184 | A | 12/1986 | Ferrero |
| 5,023,758 | A | 6/1991 | Allen et al. |
| 5,765,940 | A | 6/1998 | Levy et al. |
| 5,842,776 | A | 12/1998 | Shigemura et al. |

(Continued)

FOREIGN PATENT DOCUMENTS

JP 8212804 A 8/1996

*Primary Examiner* — Zheng Song
(74) *Attorney, Agent, or Firm* — Frank Lollo; Price Heneveld LLP

(57) ABSTRACT

A vehicle light assembly comprising a light chamber secured to a vehicle member. The chamber includes a partially transmissive lens and an interior. The interior includes a plurality of isotropically luminant surfaces and a substantially reflective surface. Further, the vehicle light assembly includes a light source arranged within the light chamber, and the light source is substantially oriented to emanate light that initially strikes the substantially reflective surface, propagates within the chamber along the isotropically luminant surfaces, and exits the chamber through the lens.

13 Claims, 7 Drawing Sheets

(56) References Cited

U.S. PATENT DOCUMENTS

| | | | |
|---|---|---|---|
| 6,062,710 A * | 5/2000 | Hewitt | F21V 5/002 |
| | | | 362/351 |
| 6,095,673 A | 8/2000 | Goto et al. | |
| 6,527,410 B2 | 3/2003 | Yamaguchi | |
| 6,543,923 B2 | 4/2003 | Tamai | |
| 6,637,923 B2 | 10/2003 | Amano | |
| 6,886,967 B2 | 5/2005 | Quang | |
| 7,350,947 B2 | 4/2008 | Reading | |
| 7,399,106 B2 | 7/2008 | Reading | |
| 8,052,295 B2 * | 11/2011 | Kim | G02F 1/133603 |
| | | | 362/225 |
| 2001/0021110 A1 | 9/2001 | Nakayama et al. | |
| 2004/0196667 A1 | 10/2004 | Lea | |
| 2004/0257790 A1 | 12/2004 | Tanaka et al. | |
| 2005/0138852 A1 | 6/2005 | Yamauchi | |
| 2005/0280785 A1 | 12/2005 | Beeson et al. | |
| 2007/0030688 A1 | 1/2007 | Ko et al. | |
| 2007/0091613 A1 | 4/2007 | Lee et al. | |
| 2008/0074901 A1 | 3/2008 | David et al. | |
| 2008/0225548 A1 | 9/2008 | Eichelberger | |
| 2008/0232127 A1 | 9/2008 | Futami | |
| 2009/0003002 A1 | 1/2009 | Sato | |
| 2010/0014309 A1 | 1/2010 | Heidinger | |
| 2010/0195342 A1 | 8/2010 | Lambert et al. | |
| 2011/0317442 A1 * | 12/2011 | Makiuchi | F21S 48/24 |
| | | | 362/519 |
| 2012/0057363 A1 | 3/2012 | Ishida et al. | |
| 2012/0075849 A1 * | 3/2012 | Potter | B60K 37/02 |
| | | | 362/235 |
| 2012/0120672 A1 * | 5/2012 | Stagg | B60Q 1/2607 |
| | | | 362/510 |
| 2012/0268940 A1 * | 10/2012 | Halin | G02B 5/045 |
| | | | 362/290 |
| 2012/0281407 A1 | 11/2012 | Sinofsky | |
| 2013/0265791 A1 | 10/2013 | Dassanayake et al. | |
| 2015/0003055 A1 | 1/2015 | Lacroix | |

* cited by examiner

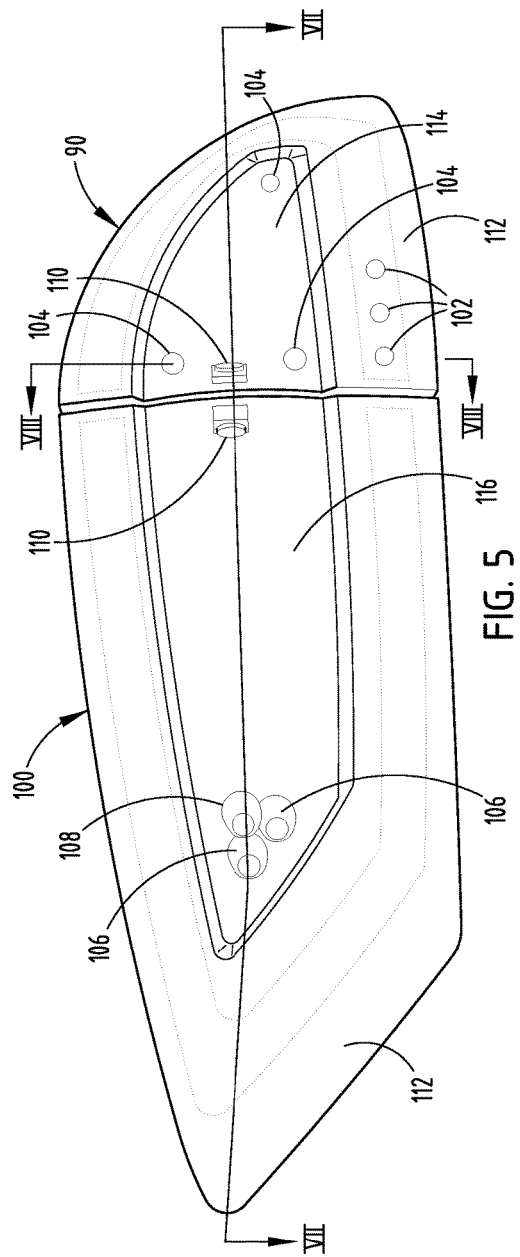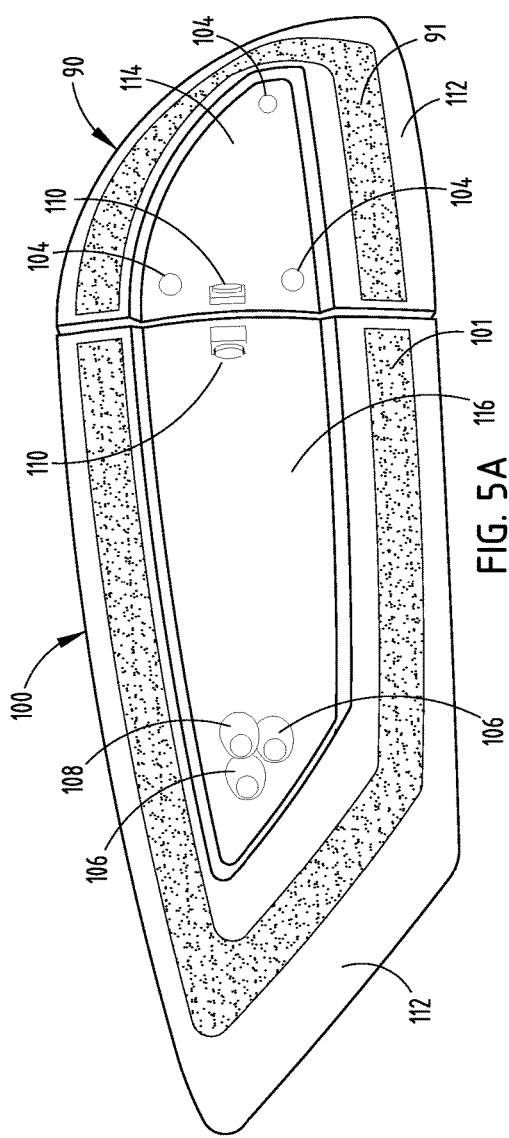

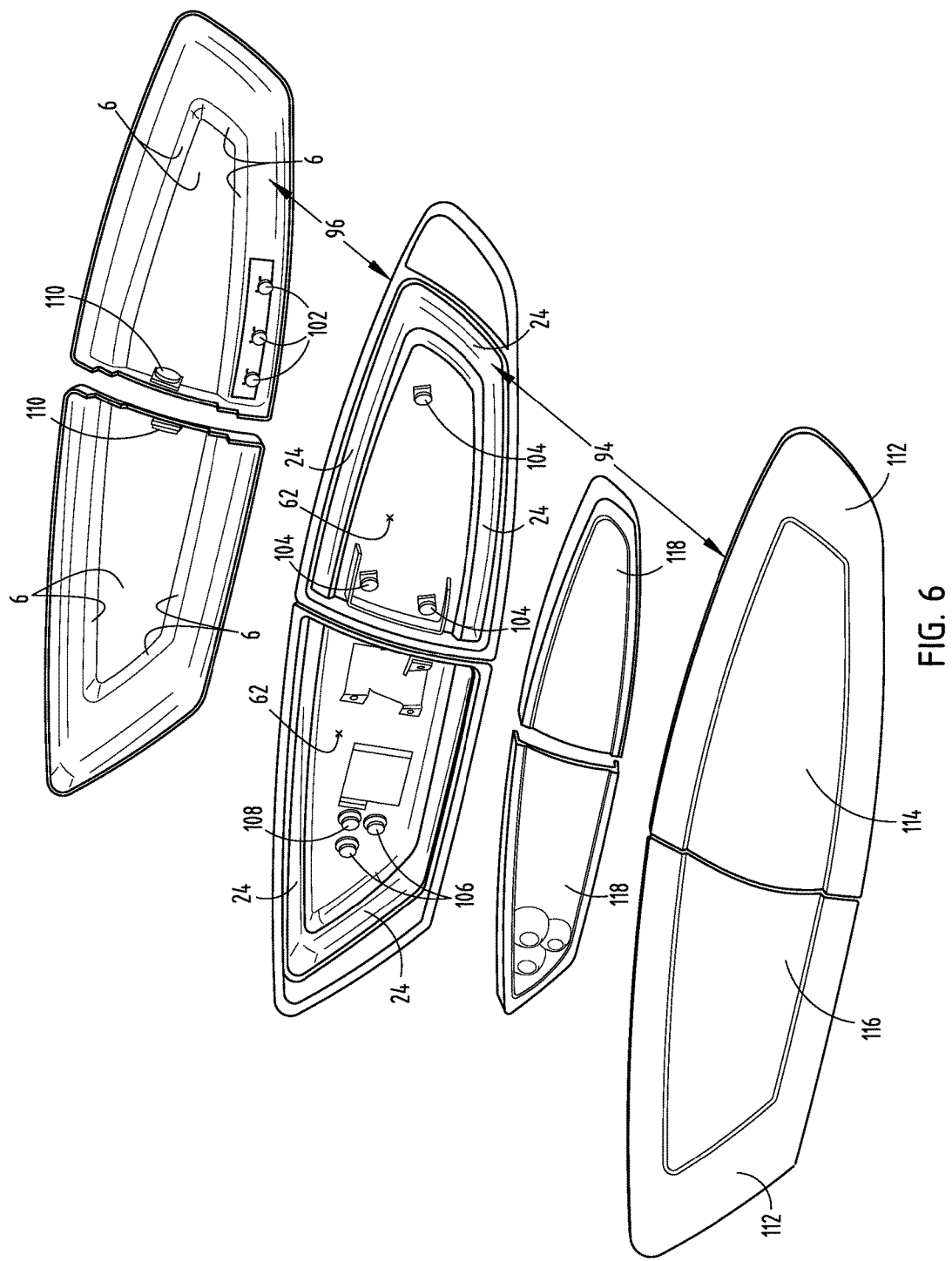

VEHICLE LIGHT ASSEMBLY WITH PHOTON RECYCLING

CROSS-REFERENCE TO RELATED APPLICATION

This application is a continuation application that claims priority to and the benefit under 35 U.S.C. § 120 of U.S. patent application Ser. No. 13/443,298 filed on Apr. 10, 2012, entitled "VEHICLE LIGHT ASSEMBLY WITH PHOTON RECYCLING," the entire disclosure of which is incorporated by reference herein.

FIELD OF THE INVENTION

The present invention generally relates to light sources and assemblies for vehicles and, more particularly, light sources and assemblies for vehicle signals that produce uniform light output.

BACKGROUND OF THE INVENTION

Current light source technologies, such as light-emitting diodes (LEDs), offer long life and lower power consumption relative to older technologies, including halogen and incandescent-based light sources. Reduced electrical power consumption by a vehicle can provide increased vehicle fuel efficiency. The longer lifetimes associated with LEDs can justify their relatively higher cost compared to other light sources.

LED lights, however, have certain disadvantages when employed in vehicle signaling applications. For example, LEDs are highly directional in the sense that they produce high light output over a relatively small area. Light sources that rely on LEDs often have an undesirable appearance with bright hot spots. This characteristic may limit the use of standard LEDs in vehicle signaling applications that require homogeneous light output over a large area. LEDs also have lower light output limits relative to other lighting technologies. Consequently, numerous LEDs may need to be employed in conventional light source assembly arrangements, resulting in high cost and power consumption levels for these light assemblies.

In view of the above, it is apparent that there exists a need for vehicle light assemblies for signaling applications that produce uniform light output, use relatively little power and can be manufactured at relatively low cost.

SUMMARY OF THE INVENTION

One aspect of the present disclosure is to provide a vehicle light assembly that includes a light chamber on a vehicle member having interior, non-specular surfaces and a lens; and an LED source oriented within the chamber to emanate light that strikes one of the non-specular surfaces, reflects against the non-specular surfaces, and exits the chamber through the lens with uniform intensity. The lens has an optical transmissivity of approximately 60% to 70%.

Another aspect of the present disclosure is to provide a vehicle light assembly that includes a light chamber on a vehicle member having interior, non-specular surfaces and a lens comprising partially transmissive and substantially reflective portions; and an LED source aimed within the chamber to emanate a majority of light that strikes the reflective portion, reflects against the non-specular surfaces, and exits the chamber through the partially transmissive portion with uniform intensity.

A further aspect of the present disclosure is to provide a vehicle light assembly that includes a first chamber having interior, non-specular surfaces and a lens comprising partially transmissive and substantially reflective portions; an LED source within the first chamber to emanate light that strikes the reflective portion, reflects against the non-specular surfaces, and exits the first chamber through the partially transmissive portion with uniform intensity; and a second chamber over the first chamber comprising a light source arranged to emanate a spot pattern.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a rear perspective view of a tail light assembly with vehicle light assembly embodiments;

FIG. 5A is a rear perspective view of the tail light assembly illustrated in FIG. 5 in an illuminated state;

FIG. 6 is an exploded, rear perspective view of the tail light assembly illustrated in FIG. 5;

DETAILED DESCRIPTION OF THE PREFERRED EMBODIMENTS

Figure 1:
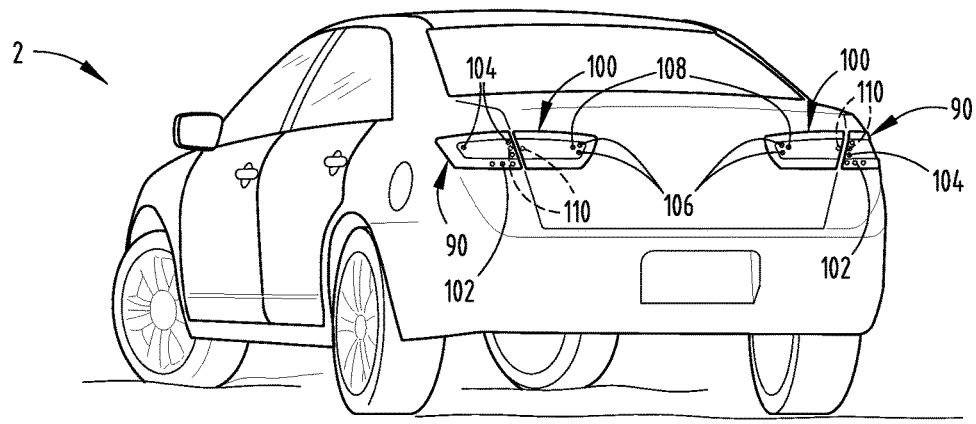
FIG. 1 is a perspective view of a vehicle depicting rear position lamps with vehicle light assemblies according to one embodiment mounted in trunk and rear side panel locations.

For purposes of description herein, the terms "upper," "lower," "right," "left," "rear," "front," "vertical," "horizontal," and derivatives thereof shall relate to the invention as oriented in FIG. 1. However, the invention may assume various alternative orientations, except where expressly specified to the contrary. In addition, the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
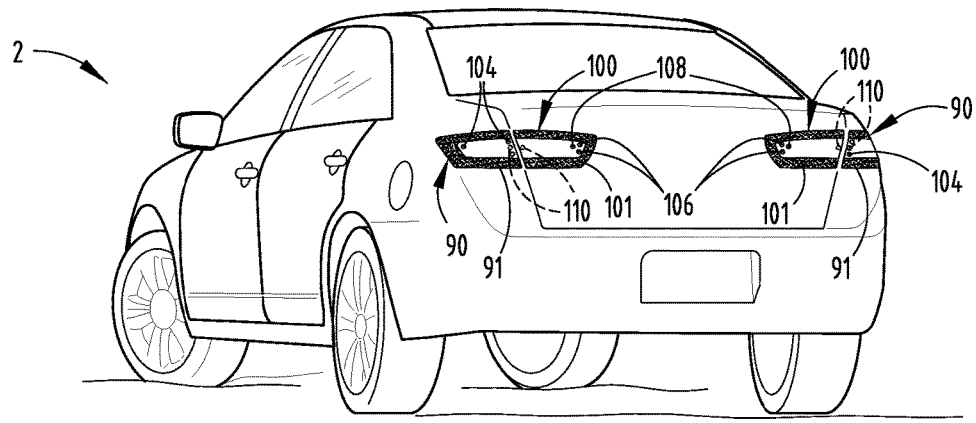
FIG. 1A is a perspective view of a vehicle depicting rear position lamps with illuminated vehicle light assemblies mounted in trunk and rear side panel locations.
Figure 2:
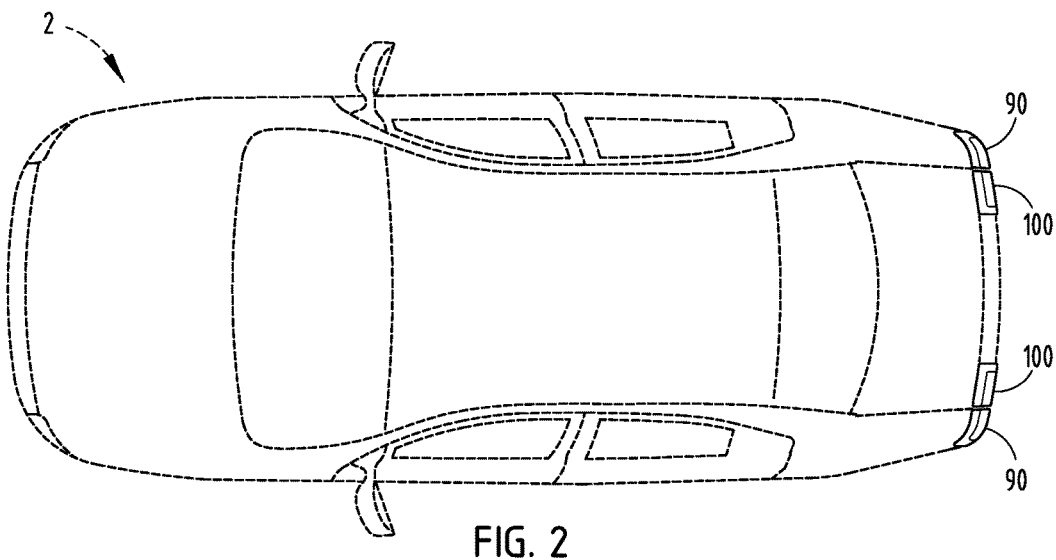
FIG. 2 is a plan view of vehicle illustrated in FIG. 1 with vehicle light assemblies mounted in trunk and rear side panel locations.

FIGS. 1, 1A and 2 provide perspective and plan views of vehicle 2 configured with trunk tail light assemblies 100 and rear side panel tail light assemblies 90. Tail light assemblies 90 and 100 are coupled to members (not shown) of vehicle 2 and function as vehicle tail light signals. In particular, assemblies 90 and/or 100 provide the following functions: rear turn signal (e.g., illuminated with a yellow or amber light when turn signals or hazard button is activated), rear position (e.g., illuminated with a red light when headlights are ON), stop signal (e.g., illuminated with a high intensity red light when brakes are applied) and reverse (e.g., illuminated with a high intensity white light when the vehicle transmission is in reverse). Light assemblies 90 and/or 100 may also provide a rear fog light function (e.g., illuminated with a high intensity red light). The stop light signals are illuminated by stop light sources 102; the rear turn signals are illuminated by turn signal light sources 104; the fog light signals are illuminated by fog light sources 106; and the reverse (back-up) signals are illuminated by reverse (backup) light sources 108.

Figure 4:
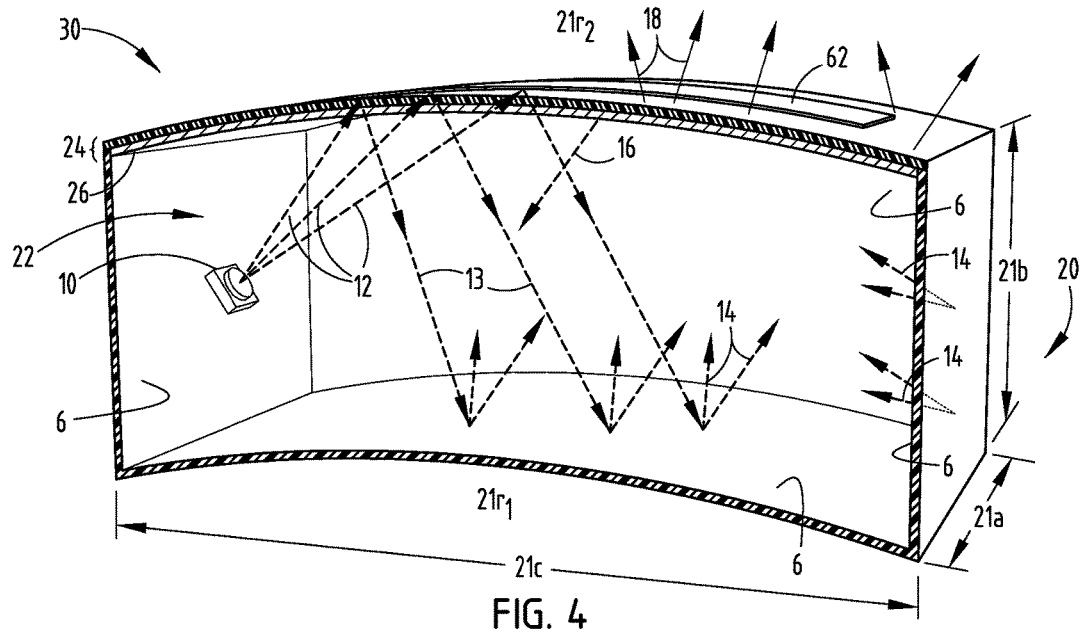
FIG. 4 is an exploded, perspective view of a schematic of a second embodiment according to the vehicle light assembly.
Figure 4A:
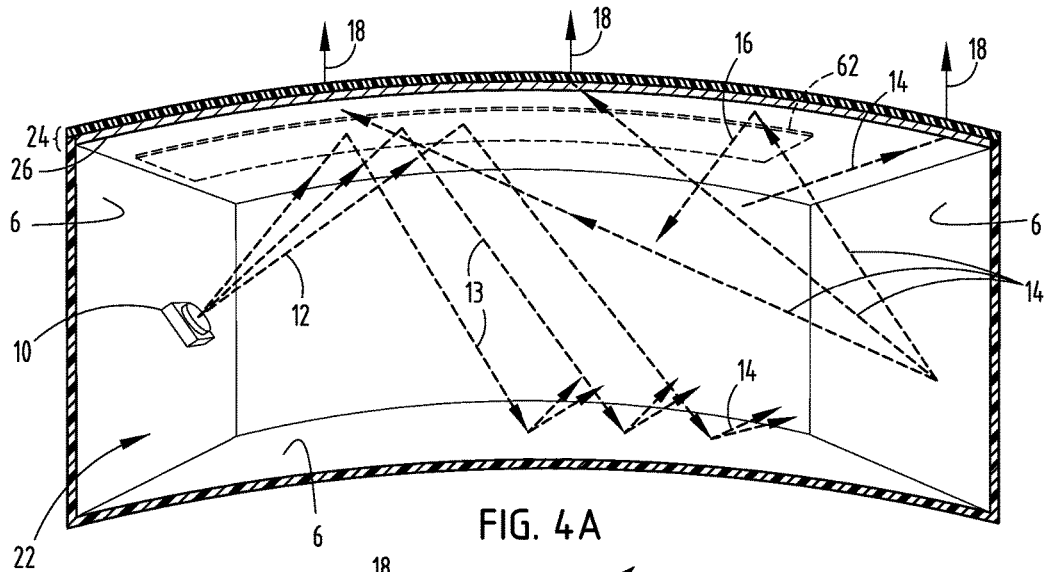
FIG. 4A is an upward-oriented, exploded perspective view of the vehicle light assembly in FIG. 4.
Figure 4B:
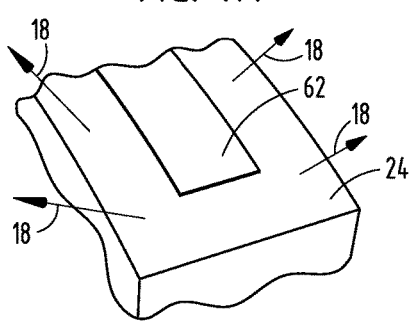
FIG. 4B is an enlarged, top-down, exploded perspective view of the vehicle light assembly in FIG. 4.
Figure 7:
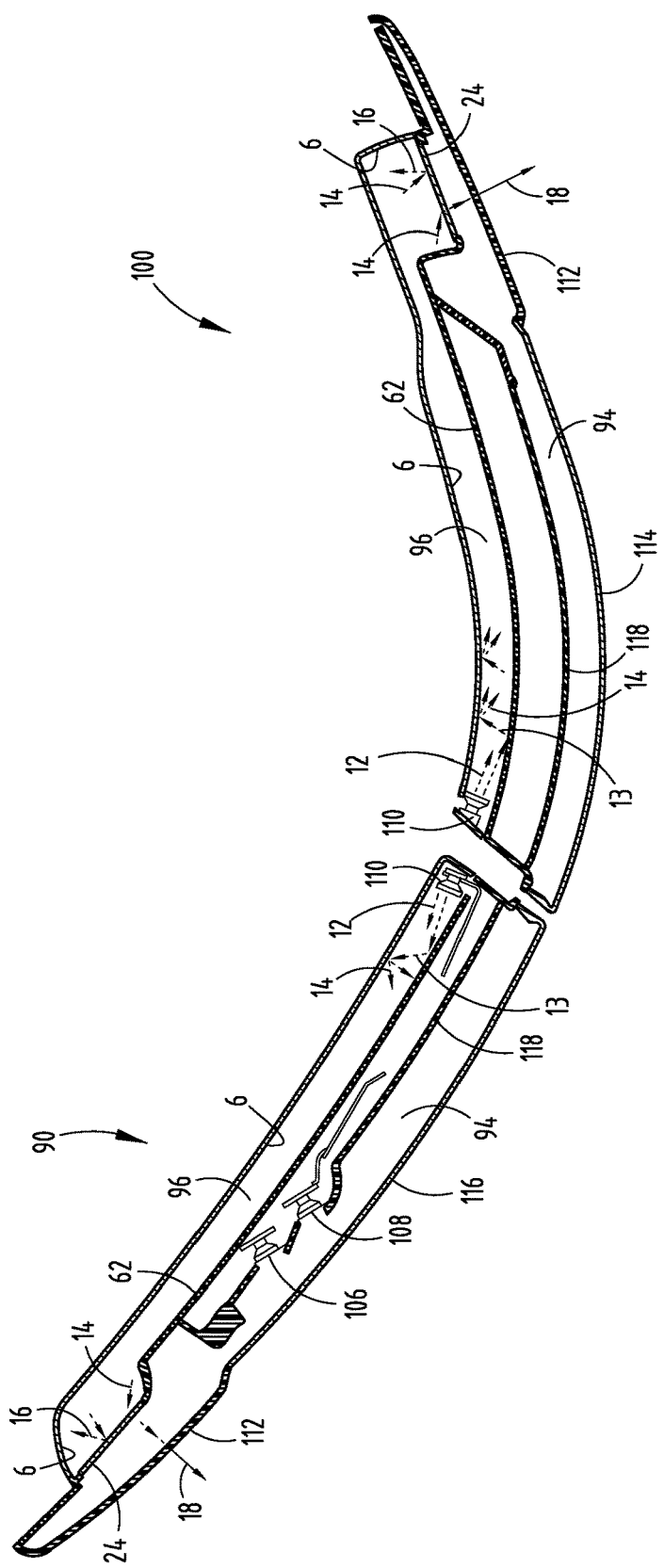
FIG. 7 is downward, cross-sectional view of the tail light assembly illustrated in FIG. 5 at the approximate mid-plane of the assembly.

Trunk and rear side panel light assemblies 90 and 100 each contain a vehicle light source assembly comparable to light source assembly 60, depicted in schematic form in FIGS. 4, 4A and 4B and described in further detail in subsequent sections of this specification. In addition, FIGS. 5-7 depict vehicle arrangements of tail light assemblies that are suitable for use as tail light assemblies 90 and 100 in the configuration shown in FIGS. 1, 1A and 2. Likewise, these assemblies are described in further detail in later sections of this specification.

Although not shown in FIGS. 1, 1A and 2, vehicle light source assembly 60 provides the rear position signal function in the depicted configuration. FIG. 1A shows light assemblies 90 and 100 when the rear position signal function is in an ON-state. Accordingly, FIG. 1A depicts the situation when vehicle light source assembly 60 exists in an illuminated state when tail light sources 110 (shown in FIGS. 5B and 6) are activated. When light source assembly 60 is illuminated, the red light produced by assembly 60 is highly uniform across portions 91 and 101 of tail light assemblies 90 and 100. In some configurations, the red light produced by assemblies 90 and 100 (i.e., when light source assembly 60 is illuminated) will appear as glowing without any discrete, high-intensity spots. Put another way, the light source(s) 110 within light source assembly 60 are not readily discernible by an observer outside of vehicle 2, even when light source assembly 60 is an illuminated state.

Figure 3:
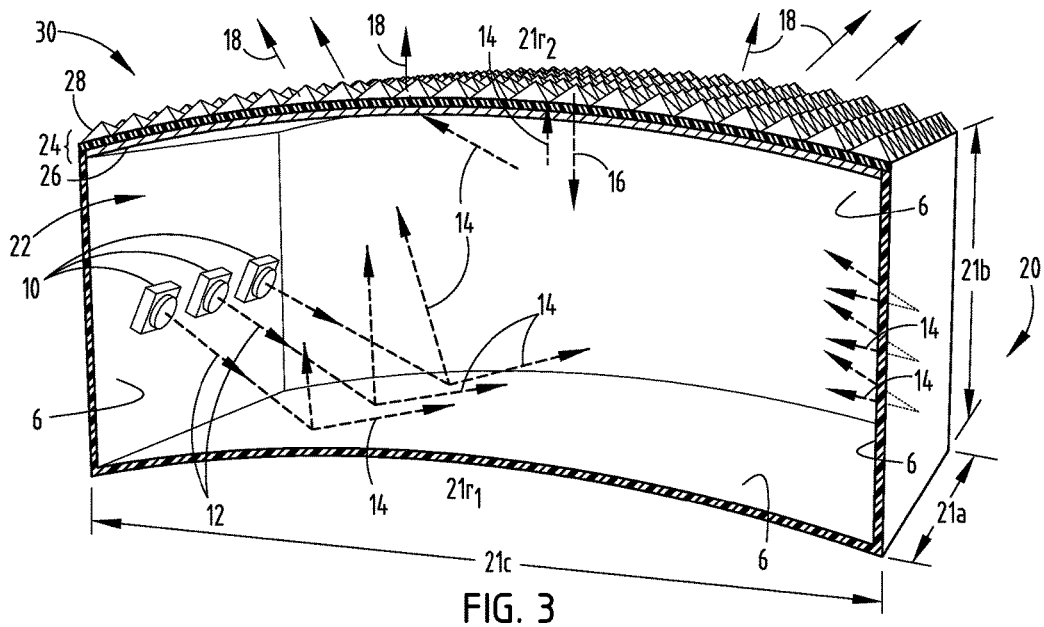
FIG. 3 is an exploded perspective view of a schematic of one embodiment of the vehicle light assembly.
Figure 3A:
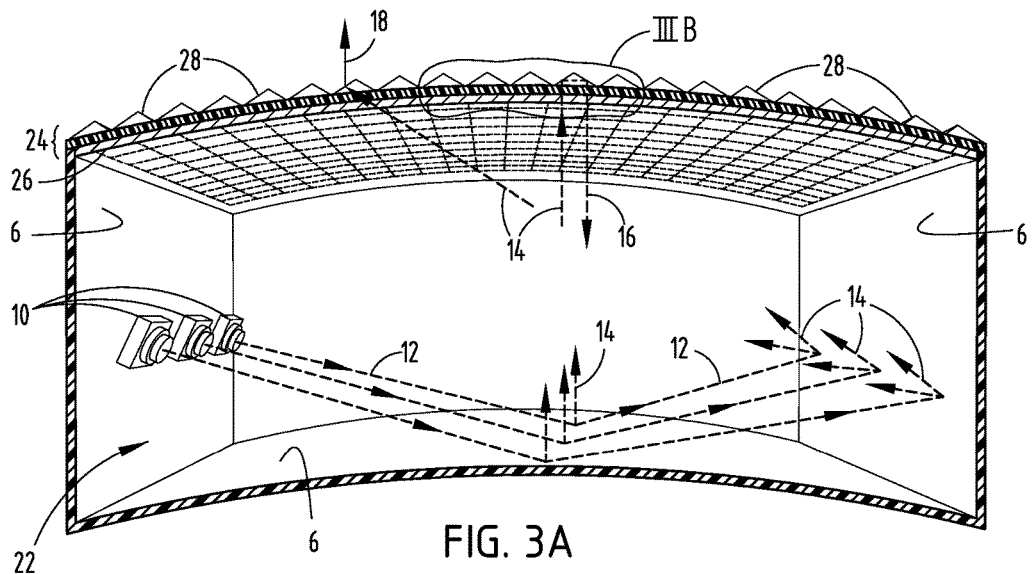
FIG. 3A is an upward-oriented, exploded perspective view of the vehicle light assembly in FIG. 3.

FIGS. 3 and 3A provide a schematic of a vehicle light assembly 30 that may be used, for example, in a rear portion of a vehicle, particularly in the trunk and/or rear side panels. The vehicle light assembly 30 includes a light chamber 20 that is secured to a member of a vehicle (not shown). Chamber 20 includes a partially transmissive lens 24 and an interior 22 with a plurality of isotropically luminant surfaces 6. Partially transmissive lens 24 further includes multiple prismatic elements 28 (with multiple facets oriented approximately 40 to 50 degrees from the plane defined by prismatic lens 24), and an anti-reflective layer 26. As depicted in FIGS. 3 and 3A, chamber 20 is defined by width $21a$, height $21b$ and length $21c$. Chamber 20 is also defined by inner radius $21r_1$ and outer radius $21r_2$.

Vehicle light assembly 30 also includes multiple light sources 10 that are substantially oriented to emanate light rays 12 that initially strike at least one of the isotropically luminant surfaces 6. After striking an isotropically luminant surface 6, initial light rays 12 are reflected and propagated within the chamber 20 as propagating light rays 14. Note that initial rays 12 reflect in various directions off of at least one isotropically luminant surface 6, thus propagating within chamber 20 as propagating light rays 14. These propagating light rays 14 continue to reflect and propagate within chamber 20 off of other isotropically luminant surfaces 6 within the interior 22 of chamber 20.

Eventually, propagating light rays 14 strike partially transmissive lens 24 and prismatic elements 28. Low angle propagating light rays 14 (rays directed at an angle 40 to 45 degrees or less from normal to the partially transmissive lens 24) are reflected off of the prismatic elements 28 within the partially transmissive lens 24 as internally reflected rays 16. These reflected rays 16 continue to reflect and propagate within chamber interior 22 off of the isotropically luminant surfaces 6. Other high angle propagating light rays 14 (rays directed at an angle greater than 45 from normal to the partially transmissive lens 24) are transmitted through partially transmissive lens 24 and prismatic elements 28 as transmitted light rays 18.

Figure 3B:
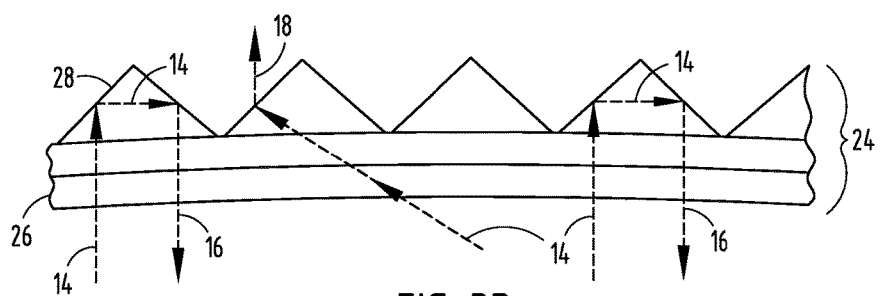
FIG. 3B is an enlarged, upward-oriented, exploded perspective view of the vehicle light assembly in FIG. 3.

Internally reflected light rays 16 (as reflected from prismatic elements 28) are depicted in greater detail in FIG. 3B. Propagating light rays 14 that strike prismatic elements 28 at an angle 40 to 45 degrees or less from normal to the partially transmissive lens 24 (i.e., low-angle propagating light rays 14) are reflected back within chamber 22 as reflected light rays 16. In contrast, high-angle propagating light rays 14 that strike elements 28 at an angle greater than 45 degrees from normal to lens 24 are transmitted through the lens 24 and prismatic elements 28, exiting the chamber interior 22. The threshold angle for internal reflection of propagating light rays 14 off of prismatic elements 28 depends on the configuration of prismatic elements 28. As such, the facets of prismatic elements 28 may be arranged in various angles, thus affecting the threshold angle of propagating light rays 14 that will be internally reflected off of prismatic elements 28. Accordingly, this threshold angle also affects the overall percentage of light rays 14 that are transmitted through lens 24, and the percentage of light rays 14 that continue to propagate and reflect within chamber interior 22. Preferably, the facets of prismatic elements 28 are oriented such that propagating light rays 14 that strike prismatic elements 28 at an angle of forty-two degrees (42°) or less from normal to the lens 24 are reflected back within chamber interior 22 as reflected light rays 16. Still further, the dimensions of prismatic elements 28 (e.g., relative height, pitch, shape, and peak-to-peak spacing) can be adjusted within partially transmissive lens 24 in vehicle light source assembly 30 to achieve similar effects.

As further illustrated in FIGS. 3 and 3A, transmitted light rays 18 thus exit chamber 20 through partially transmissive lens 24. These transmitted rays 18 are uniform (or nearly uniform) in intensity throughout the surface area of partially transmissive lens 14. The maxima and minima of intensity of the emission pattern associated with initial light rays 12 from light sources 10 are averaged through the process of light reflection and propagation within chamber interior 22 off of the isotropically luminant surfaces 6. Consequently, light rays 18 viewed by an observer are uniform over the broad area of lens 24, giving the lens a glowing appearance with no discrete locations of high intensity light.

Transmitted light rays 18 that pass through partially transmissive lens 24 also pass through an anti-reflective layer 26, if present. In FIGS. 3 and 3A, anti-reflective layer 26 is configured as part of lens 24. Anti-reflective layer 26 can be comprised of various materials and compositions as known in the art to block all but certain, desired light wavelengths. Preferably, anti-reflective layer 26 is configured to reflect all but red, amber, yellow or white wavelengths of light. Accordingly, transmitted rays 18 will appear red, amber, yellow or white depending on the configuration of anti-reflective layer 26. In addition, anti-reflective layer 26 may be configured as a separate anti-reflective lens beneath partially transmissive lens 24 in chamber interior 22 or anti-reflective layer 26 may be configured as an anti-reflective lens external to partially transmissive lens 24. In either configuration, transmitted light rays 18 that pass through anti-reflective layer 26 and exit chamber interior 22 will appear to the outside observer in a particular hue—red, yellow, amber or white.

Various light sources may be employed for light sources 10 as known in the art. Preferably, high power LED light sources are used for light sources 10. Even when light sources 10 are configured as high power LEDs, the light reflection and propagation within chamber interior 22 has the effect of producing a uniform intensity light pattern that emanates from vehicle light assembly 30.

Partially transmissive lens 24 may be configured with or without prismatic elements 28. Thus, other configurations of partially transmissive lens 24 are viable that ensure that some propagating light rays 14 continue to reflect and propagate within chamber interior 22 before passing through lens 24 as transmitted rays 18. According to one embodiment, lens 24 is configured to ensure that approximately 60 to 70% of propagating light rays 14 that strike lens 24 are reflected as internally reflected rays 16 and continue to propagate within chamber interior 22. Partially transmissive lens 24, for example, may be configured with various metalized layers that permit transmission of some, but not all incident light rays. For instance, a relatively thin aluminum metalized layer can provide the partially transmissive effect required of lens 24. Other metal films, layers, compositions and structures as known in the art can also be arranged within partially transmissive lens 24 to achieve a similar function.

Isotropically luminant surfaces 6 are arranged on all interior surfaces of chamber interior 22 except for the surface(s) associated with partially transmissive lens 24. Isotropically luminant surfaces 6 (i.e., non-specular surfaces) are defined such that when light falls on them, the light is scattered to a degree that the apparent brightness of the surface to an observer is relatively uniform regardless of the observer's angle of view. Accordingly, isotropically luminant surfaces 6 may be comprised of various materials, films, layers and structures as known in the art, provided that they diffuse and propagate initial light 12, propagating light 14 and internally reflected light 16, all within chamber interior 22. For example, isotropically luminant surfaces 6 could be fabricated from a white, polyurethane material with a matte finish. Alternatively, isotropically luminant surfaces 6 can be fabricated of any number of materials and structures, provided that they are coated with a non-specular, matte white paint.

Light source assembly 30 may include a plurality of light sources 10. However, the quantity of light sources 10 required in assembly 30 to produce a relatively uniform light intensity pattern emanating from chamber 20 is relatively low. Thus, vehicle light assembly 30 achieves a highly uniform light emission pattern with low energy usage and low light source assembly cost. In addition, light source assembly 30 may rely on a single light source 10 to produce the desired high uniformity light emission pattern that emanates from chamber 20.

Chamber 20 and its interior 22 are not limited to the rectangular cuboid-like configuration depicted in FIG. 3 according to dimensions $21a$, $21b$, $21c$, $21r_1$ and $21r_2$. Chamber 20 may be arranged in various shapes and geometries provided that it contains an interior 22 with interior surfaces comprising isotropically luminant surfaces 6 and at least one partially transmissive lens 24. In particular, chamber 20 can be engineered to optimize the propagation effects of initial light rays 12 from light source(s) 10 within chamber interior 22. For example, chamber 20 can be configured in a slender shape (e.g., akin to a fiber optic cable or light pipe) with light source(s) arranged at an oblique angle to enhance the light reflection and propagation effect off of the isotropically luminant surfaces 6 within chamber interior 22. In essence, the dimensions and shape of chamber 20 are optimized to maximize the propagation and reflection of initial light rays 12 to average out the maxima and minima of the incident light emission pattern from light source(s) 10 arranged within chamber interior 22.

FIG. 4 depicts another vehicle light assembly 60 that may be employed, for example, in a rear position lamp in the trunk of a vehicle and/or rear side panel of vehicle light assemblies, such as the assemblies 90 and 100 that are coupled to vehicle 2 and depicted in FIGS. 1 and 2. In almost all respects, vehicle light assembly 60 is configured and operates in the same fashion as the vehicle light assembly 30 shown in FIGS. 3, 3A and 3B. As depicted in FIG. 4, there are two differences in vehicle light assembly 60 compared to assembly 30: (a) the addition of a substantially reflective layer 62 to partially transmissive lens 24; and (b) the orientation of light source(s) 10 toward reflective layer 62.

Chamber 20 of vehicle light assembly 60 includes a chamber interior 22 having a substantially reflective layer 62 in addition to multiple isotropically luminant surfaces 6. Chamber 20 also includes a partially transmissive lens 24. Substantially reflective layer 62 may be configured within, adjacent to or underneath partially transmissive lens 24. The light source 10 or light sources 10 are arranged within chamber 20 and substantially oriented to emanate light 12 that initially strikes the reflective surface 62, reflecting off of surface 62 as initially reflected light 13 (see also FIG. 4A). Light source(s) 10 are configured (e.g., aimed) to ensure that the majority of the initial light 12 initially strikes reflective surface 62 and reflects within chamber interior 22 as initially reflected light 13.

In turn, these initially reflected light rays 13 strike the isotropically luminant surfaces 6, thus reflecting and propagating within chamber interior 22 as propagating light 14. These propagating light rays 14 eventually strike partially transmissive lens 24. Some of them are transmitted through lens 24 (and anti-reflective layer 26, if present) as transmitted light 18 and others are reflected off of lens 24 within chamber interior 22 as internally reflected light 16 (see FIGS. 4A and 4B). Ultimately, the effect of this light reflection and propagation within the chamber interior 22 is similar to the effect described for the vehicle light assembly 30 depicted within FIG. 3.

FIGS. 5 and 5A provide a perspective view of tail light assemblies 90 (rear side panel) and 100 (trunk). These assemblies may be employed as the tail light assemblies in the configuration of vehicle 2 depicted in FIGS. 1, 1A and 2. As shown in FIGS. 5 and 5A, vehicle tail light assembly (rear side panel) 90 includes turn signal, stop/brake light and rear position functions. For instance, assembly 90 includes turn signal light sources 104 arranged behind a yellow anti-reflective lens 114. All but yellow-hued wavelengths of light from turn signal light sources 104 are reflected within the assembly 90. Thus, only yellow light is transmitted and viewable by an outside observer when turn signals of the vehicle (not shown) are activated. Vehicle tail light assembly 90 also includes stop light sources 102 arranged behind a red anti-reflective lens 112. High intensity light from stop light sources 102 is transmitted through red anti-reflective lens 112 and only red wavelengths from light sources 102 are visible when the brakes of the vehicle (not shown) have been activated.

Vehicle tail light assembly (trunk) 100 includes fog, reverse and rear position functions. For instance, assembly 100 includes fog light sources 106 arranged behind a white anti-reflective lens 116. All but white-hued wavelengths of light from light sources 106 are reflected within the assembly 100. Consequently, only white light is transmitted and viewable by an outside observer when the fog light function of the vehicle (not shown) has been activated. Similarly, assembly 100 includes a reverse (backup) light source 108, also arranged behind the white anti-reflective lens 116. Accordingly, when the vehicle is engaged in reverse, the reverse light source 108 is activated and only white light is observable outside of assembly 100.

Tail light sources 110 configured within vehicle light assembly 60 (not shown in FIGS. 5 and 5A) serve as the light source for vehicle tail light assemblies 90 and 100 and provide the rear position function of the tail lights of the vehicle. Light from light sources 110 reflects and propagates within the chamber interior 22 (not shown in FIGS. 5 and 5A) associated with each of the assemblies 60 within vehicle light assemblies 90 and 100. This light is then transmitted through the partially transmissive lens 24 (also not shown) and the red, anti-reflective lens 112. Eventually, this light is visible as red light emanating from assemblies 90 and 100 according to the rear position function. For example, vehicle tail light assemblies 90 and 100 are illuminated according to the rear position function when the operator has activated the headlights of the vehicle. Tail light sources 110 are then activated causing vehicle light assemblies 90 and 100 to be illuminated with a glowing, red hue as shown in FIG. 5A in schematic form.

Figure 8:
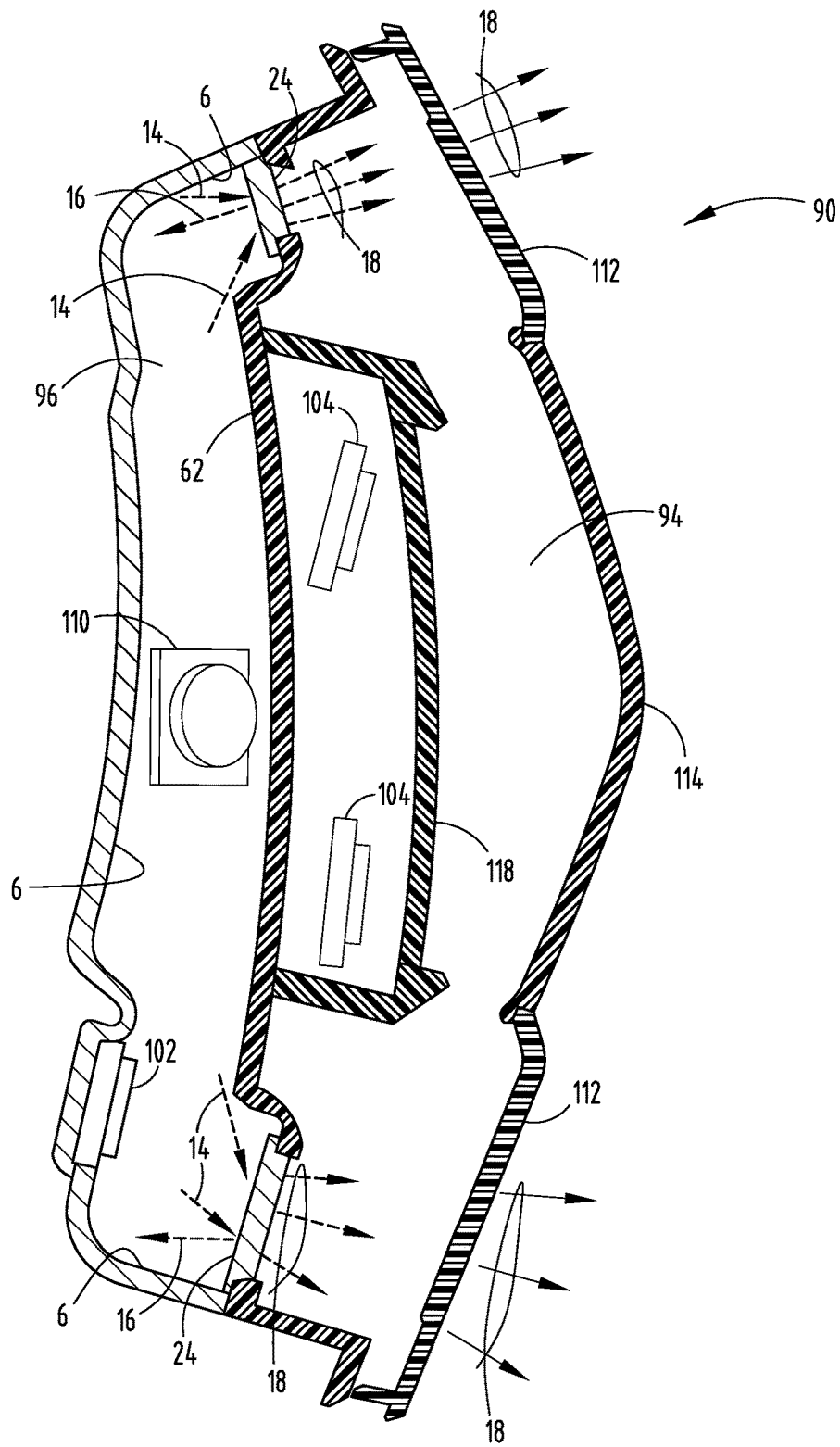
FIG. 8 is a leftward, cross-sectional view of the rear side panel portion of the tail light assembly illustrated in FIG. 5 at a plane near the trunk portion of the tail light assembly.

FIG. 6 provides an exploded, perspective view of the vehicle light assemblies 90 and 100 depicted in FIGS. 5 and 5A. In addition, FIGS. 7 and 8 provide cross-section views of the vehicle light assemblies 90 and 100 depicted in FIGS. 5 and 5A. As shown in FIGS. 6-8, both vehicle light assemblies 90 and 100 contain two chambers, one top-most (outer) chamber 94 and one bottom-most (inner) chamber 96. In vehicle light assembly 90, the top-most (outer) chamber 94 is defined by red, anti-reflective lens 112, white, anti-reflective lens 116, fog and reverse (backup) light sources 106 and 108, substantially reflective surface 62 and partially transmissive lens 118. As described above, lights sources 106 and 108 transmit light through partially transmissive lens 118 and white, anti-reflective lens 116 (not lens 112), producing visible white light when the fog lights are activated or the vehicle is placed into a reverse gear (not shown). Similarly, the top-most (outer) chamber 94 in vehicle light assembly 100 is defined by red, anti-reflective lens 112, yellow, anti-reflective lens 114, turn signal light sources 104, substantially reflective surface 62 and partially transmissive lens 118. As also described above, light sources 104 transmit light through partially transmissive lens 118 and yellow, anti-reflective lens 114 (not lens 112), producing visible yellow light when the turn signals in the vehicle (not shown) have been activated.

The bottom-most (inner) chamber 96 depicted in FIGS. 6-8 for both vehicle light assemblies 90 and 100 is defined by light source 110, stop light sources 102, substantially reflective surface 62, partially transmissive lens 24 and isotropically luminant surfaces 6. When the brakes of the vehicle (not shown) have been activated, the stop light sources 102 are illuminated and light is transmitted through partially transmissive lens 24 into top-most (outer) chamber 94, and then through red, anti-reflective lens 112. Accordingly, the light exiting top-most (outer) chamber 94 according to the stop-light function appears bright red and the light sources 102 are visible as discrete, high-intensity spots from the rear of the vehicle.

In contrast, when the head lights of the vehicle have been activated, vehicle light assemblies 90 and 100 engage the rear position function of the vehicle, producing a uniform, red glow emanating from each of the assemblies 90 and 100. Light from light source 110 is directed within the bottom-most chamber 96 toward substantially reflective surface 62. The light is then reflected off of substantially reflective surface 62 and strikes one or more of the isotropically luminant surfaces 6 within the bottom-most chamber 96. As a result, the light reflects and propagates within chamber 96 off of other isotropically luminant surfaces 6 as propagating light rays 14. It then strikes partially transmissive lens 24. Some of the propagating light 14 is then transmitted through partially transmissive lens 24 as transmitted light rays 18 and then enters the top-most chamber 94. At this point, the light then passes through chamber 94 and through red, anti-reflective lens 112. As such, vehicle light assemblies 90 and 100 are illuminated with a glowing red appearance in the region of the top-most chamber 94 where red, anti-reflective lens 112 is present. Note that the remainder of the light that is not transmitted through lens 24 reflects as internally reflected light rays 16 and propagates further off of isotropically luminant surfaces 6 within bottom-most chamber 96 as propagating rays 14. This process continues until the propagating light rays 14 eventually exit chamber 96 through lens 24, and the red, anti-reflective lens 112.

Vehicle light assemblies that employ light source assembly 30, light source assembly 60 or related configurations can be used in vehicle signaling applications requiring uniform light output at low cost and power consumption. The appearance of the light output from these light source assemblies is also aesthetically pleasing. Further, these light source assemblies can be readily engineered into a variety of assembly shapes, sizes and dimensions without significantly comprising performance, cost and power usage. Variations and modifications can be made to the aforementioned structure without departing from the concepts of the present invention, and further such concepts are intended to be covered by the following claims unless these claims by their language expressly state otherwise.

We claim:

1. A vehicle light assembly, comprising:
a first light chamber on a vehicle member having interior, non-specular surfaces and a substantially planar lens comprising a partially transmissive portion and a substantially reflective portion underneath, and coplanar with, the partially transmissive portion;
an LED source arranged at an end of the first light chamber at an oblique angle and aimed within the first chamber to emanate a majority of light that strikes the reflective portion, reflects against the non-specular surfaces, and exits the first chamber through the partially transmissive portion with uniform intensity;

a first light source within the first chamber positioned proximate to the partially transmissive portion of the substantially planar lens and arranged to emanate a spot pattern; and a second light chamber over the first chamber comprising an enclosure and an anti-reflective lens, the enclosure comprising a second light source and defined by the substantially planar lens of the first chamber and a partially transmissive lens.

2. The light assembly according to claim 1, wherein the light that emanates from the LED source comprises maxima and minima of intensity that are averaged through reflection and propagation within the chamber.

3. The light assembly according to claim 1, wherein the partially transmissive portion has an optical transmissivity of approximately 60% to 70%.

4. The light assembly according to claim 3, wherein the partially transmissive portion comprises a metalized layer with an optical transmissivity of approximately 60% to 70%.

5. The light assembly according to claim 3, wherein the partially transmissive portion is configured to substantially reflect the light emanated from the LED source at an angle less than or equal to 45° from a direction normal to the lens.

6. The light assembly according to claim 3, wherein the non-specular surfaces comprise a white material having a matte finish.

7. The light assembly according to claim 1, wherein the light chambers and the LED source are collectively configured in a vehicular tail-light arrangement.

8. The light assembly according to claim 7, wherein the LED source is a single, LED source aimed within the chamber to emanate a majority of light that strikes the reflective portion, reflects against the non-specular surfaces, and exits the chamber through the partially transmissive portion with uniform intensity.

9. A vehicle light assembly, comprising:

a first chamber having interior, non-specular surfaces and a substantially planar lens comprising coplanar partially transmissive and substantially reflective portions;

an LED source arranged at an end of the first chamber at an oblique angle to emanate light that strikes the reflective portion, reflects against the non-specular surfaces, and exits the first chamber through the transmissive portion with uniform intensity;

a first light source within the first chamber positioned proximate to the partially transmissive portion of the substantially planar lens and arranged to emanate a spot pattern; and a second chamber over the first chamber comprising an enclosure and an anti-reflective lens, the enclosure comprising a second light source and defined by the substantially planar lens of the first chamber and a partially transmissive lens.

10. The light assembly according to claim 9, wherein the light chambers and the LED source are collectively configured in a vehicular tail-light arrangement.

11. The light assembly according to claim 10, wherein the substantially reflective portion is arranged to substantially obscure the LED source from view outside the chambers.

12. The light assembly according to claim 10, wherein the LED source is a single, LED source aimed within the first chamber to emanate a majority of light that strikes the reflective portion, reflects against the non-specular surfaces, and exits the first chamber through the partially transmissive portion with uniform intensity.

13. The light assembly according to claim 9, wherein the partially transmissive portion has an optical transmissivity of approximately 60% to 70%.

* * * * *